Feb. 9, 1926.
P. E. FAGERHOLM
CALCULATING APPARATUS
Filed March 18, 1925
1,572,520
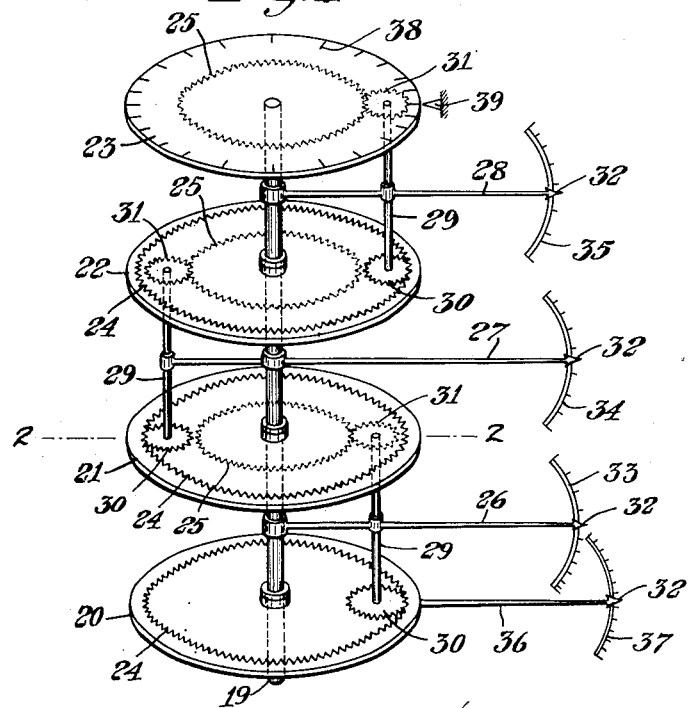
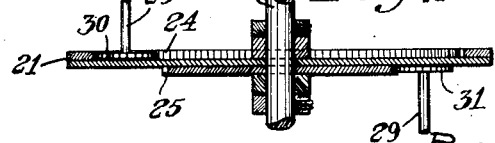
Inventor
Per E. Fagerholm Patented Feb. 9, 1926.

1,572,520

UNITED STATES PATENT OFFICE.

PER ERIK FAGERHOLM, OF STOCKHOLM, SWEDEN.

CALCULATING APPARATUS.

Application filed March 18, 1925. Serial No. 16,553.

*To all whom it may concern:*

Be it known that I, PER ERIK FAGERHOLM, a subject of the King of Sweden, residing at Stockholm, Sweden, have invented certain new and useful Improvements in Calculating Apparatus, of which the following is a specification.

This invention relates to calculating apparatus for solving numerical problems by means of function scales.

In addition to the common slide rules a plurality of different apparatus of the above kind are previously known, for instance so-called calculating rollers or calculating drums. Common to most of the latter types of calculating apparatus is that they permit an extension of the length of the function scale in order to increase the accuracy of the apparatus. As to the mode of operation they do not otherwise materially differ from the slide rules.

If by means of such an apparatus a calculation including a plurality of operations is to be made, any of the movable members of the apparatus, for instance the slide of the slide rule, has to be displaced several times, which renders the operation more difficult and increases the possibility of errors, or, as in calculating drums, a plurality of movable members has to be revolved in such manner that a certain line of each member coincides with a certain line of an adjacent member, which means a time-wasting operation including several possibilities of errors.

Further calculating apparatus are known, which are provided with movable members, by means of which the given quantities are set on function scales, and also with a result indicating member indicating the result on a further function scale, said movable index members being connected to each other and to the result indicating member by means of toothed gearings in such manner that said latter member always indicates that result which corresponds to the positions of the movable index members independent of in which order and in what manner the said latter members have been moved into said positions.

The invention relates to calculating apparatus of the last mentioned type and has for its object to improve the action of such apparatus and to simplify their construction.

The invention consists essentially in this that one or more of the gear wheels, the movements of which depends individually on the movements of the said movable index members, are, on adjusting said latter members, put not only in a rotary motion but simultaneously in a translatory motion.

In the annexed drawing one form of embodiment of an apparatus according to the invention is diagrammatically shown. Fig. 1 is a perspective view of an apparatus having four movable index members and one result indicating member. Fig. 2 represents a detail in section along line 2—2 of Fig. 1.

Referring to the drawing, 19 designates a vertical stationary shaft, on which are rotatably mounted toothed disks 20, 21, 22 and 23. The intermediate disks 21 and 22 are each provided with an outer internally toothed rim 24 on the upper side and with an inner toothed rim 25 on the under side as more plainly apparent from Fig. 2, whereas the lower disk 20 has an outer internally toothed rim 24 only on its upper side, the upper disk 23 being provided with an inner toothed rim 25 only on its under side. Rotatably mounted on said shaft 19 are, further, adjusting arms 26, 27 and 28, located between the disks and carrying by means of intermediate rotary shafts 29 pinions 30 and 31, mounted on the ends of said shafts and meshing with the outer and inner toothed rims 24 and 25, respectively, of the several disks 20 to 23, as apparent from Fig. 1. The arms 26 to 28 are provided with indexes 32 pointing at function scales 33, 34 and 35. Secured to the lowermost disk 20 is an arm 36 having an index 32 pointing at a further function scale 37. The upper disk 23 is provided with a function scale 38, on which the result is read off at a stationary index 39.

If any of the arms 26, 27, 28 and 36 is moved along its function scale, its turning movement will be transmitted to the upper disk 23 by means of the toothed disks and the pinions, and the function scale 38 on said disk 23 moves with relation to the stationary index 39. It is evident that a turning movement of any of the said arms will be transmitted to the result indicating scale 38 in the same manner independent of the positions of the other arms. The turning movement of the scale 38 will thus be a linear function of the turning movements of the arms 26, 27, 28, 36, and by suitably choosing the relation between the diameters of the toothed rims and of the pinions and the modules of the function scales it is always possible to obtain that the displacement of the scale 38 will be equal to the sum of the displacements of the indexes 32 along the scales 33, 34, 35 and 37.

Thus, on the scale 38 that sum $y$ is read off, which constitutes a solving of the equation $$f(y) = f_1(x_1) + f_2(x_2) + f_3(x_3) + f_4(x_4),$$

where the variables $x_1$, $x_2$, $x_3$ and $x_4$ are indicated on the function scales 33, 34, 35 and 37.

What I claim as new and desire to secure by Letters Patent of the United States of America is:—

A calculating apparatus of the type set forth, comprising movable index members and function scales, with which said index members co-operate, and a result indicating member, said index members and said result indicating member being connected to each other by means of toothed gearings, one or more of the gear wheels belonging to said gearing and the movements of which depend individually on the movements of said index members being, on adjusting said latter members, put not only in a rotary motion but simultaneously in a translatory motion.

In testimony whereof I affix my signature.

PER ERIK FAGERHOLM.